United States Patent [19]
Deco et al.

[11] Patent Number: 6,134,510
[45] Date of Patent: Oct. 17, 2000

[54] METHOD FOR DETECTING SYNCHRONICITY BETWEEN SEVERAL DIGITAL MEASUREMENT SERIES WITH THE AID OF A COMPUTER

[75] Inventors: Gustavo Deco; Laura Martignon, both of München, Germany

[73] Assignees: Siemens Aktiengesellschaft; Max-Planck-Gesellschaft zur Förderung de Wissenschaften, both of Munich, Germany

[21] Appl. No.: 09/319,347

[22] PCT Filed: Jan. 21, 1998

[86] PCT No.: PCT/DE98/00173

§ 371 Date: Jun. 4, 1999

§ 102(e) Date: Jun. 4, 1999

[87] PCT Pub. No.: WO98/32079

PCT Pub. Date: Jul. 23, 1998

[30] Foreign Application Priority Data

Jan. 21, 1997 [DE] Germany ............................ 197 01 931

[51] Int. Cl.[7] ............................ G06F 17/18; G06F 101/14
[52] U.S. Cl. .............................. 702/179; 702/89; 702/181
[58] Field of Search ..................................... 702/179, 181, 702/87, 89; 706/45, 48, 58

[56] References Cited

U.S. PATENT DOCUMENTS

| | | | |
|---|---|---|---|
| 4,844,086 | 7/1989 | Duffy. | |
| 5,434,794 | 7/1995 | Coudert et al. | 716/2 |
| 5,684,726 | 11/1997 | Osborn et al. | 702/181 |
| 5,737,242 | 4/1998 | Madre et al. | 706/45 |
| 5,987,398 | 11/1999 | Halverson et al. | 702/179 |

OTHER PUBLICATIONS

Laura Martignon et al, "Learning exact patterns of quasi–synchronization among spiking neurons from data on multi–unit recordings" Proceedings of the 1996 Conference, Advances in Neural Information Processing Systems 9, ISBN 0–262–10065–7, pp. 76–82.

Gustavo Deco et al, "Training Data Selection by Detecting Predictability in Non–Stationary Time Series by a Surrogate–Cumulant Based Approach", Proceedings International Workshop on Neural Networks for Identification Control, Robotics, and Signal/Image Processing, Aug. 1996, XP000676844, pp. 11–19.

Marvin C. Teich et al, "Temporal Correlation in Cat Striate–Cortex Neural Spike Trains", vol. 15, No. 5, Sep. 1996, IEEE Engineering in Medicine and Biology, XP000625354, pp. 79–87.

Laura Martignon et al, "Detecting and Measuring Higher Order Synchronization Among Neurons: A Bayesian Approach", Artificial Neural Networks, ICANN 1996, ISBN 3–540–61510–5, XP002065030, pp. 401–407.

T. M. Cover, Elements of Information Theory, John Wiley & sons, 1976, pp. 18–23, ISBN 0–471–06259–6.

*Primary Examiner*—Marc S. Hoff
*Assistant Examiner*—Bryan Bui
*Attorney, Agent, or Firm*—Hill & Simpson

[57] ABSTRACT

The method makes it possible to determine synchronicity of several measurement series which consist of binary frequency data, in order to detect redundancy between several neurons. In this case, every possible combination of synchronicity has its own occurrence probability.

The synchronicity is detected by measuring a discriminating significance, which tests a null hypothesis with a surrogate method.

One possible application is the detection of neuronal coding patterns in the brain.

2 Claims, 2 Drawing Sheets

METHOD FOR DETECTING SYNCHRONICITY BETWEEN SEVERAL DIGITAL MEASUREMENT SERIES WITH THE AID OF A COMPUTER

BACKGROUND OF THE INVENTION

The invention relates to a method for detecting synchronicity between several digital measurement series with the aid of a computer.

When presented with measurement data given by time series, which for example originate from different neurons, then it is of great interest to know with what probability synchronicity occurs between the various possible combinations of the binary signals of the time series.

FIG. 1 serves as an illustration. It shows three time series ZR1, ZR2 and ZR3 by way of example. These time series may for example originate from different neurons or, in general, represent arbitrary binary frequency data. The order O is defined as being how many times series are taken into account for the synchronicity. In FIG. 1, the order O is equal to 3. For all possible combinations of the $3^{rd}$ order binary groupings occurring in the example, a probability of synchronicity should thus in each case be given. Thus, FIG. 1 indicates by way of example a combination Pat1 (011) which occurs two times.

The reference by T. M. Cover, "Elements of Information Theory, John Wiley & Sons, 1976, pp. 18–23, ISBN 0-471-06259-6, discloses a method for determining a discriminating statistic.

SUMMARY OF THE INVENTION

The object of the invention is to provide a method for detecting synchronicity between several digital measurement series, the method being suitable in particular for detecting neuronal coding patterns in the brain.

The method formulates a nonparametric statistical approach for detecting redundancy between several digital measurement series. A relevant concrete example involves the synchronous firing of several neurons. The synchronicity is detected by measuring a discriminating significance, which tests a null hypothesis of independent firing with a surrogate method. The surrogate data used correspond to the null hypothesis of a noncausal relation between the firing or the nonfiring of several neuron groups. Rejection of the null hypothesis is based on the calculation of the discriminating statistic Λ of the original data record and of the discriminating statistic $D_{si}$ of the i-th surrogate data record which has been produced by making the null hypothesis.

As mentioned above, one refinement example of the method according to the invention may be the firing of several neurons, the number of which determines the order O, lying at the basis of the measurement series. The method according to the invention can therefore be used to solve the difficult problem of detecting neuronal coding patterns in the brain.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
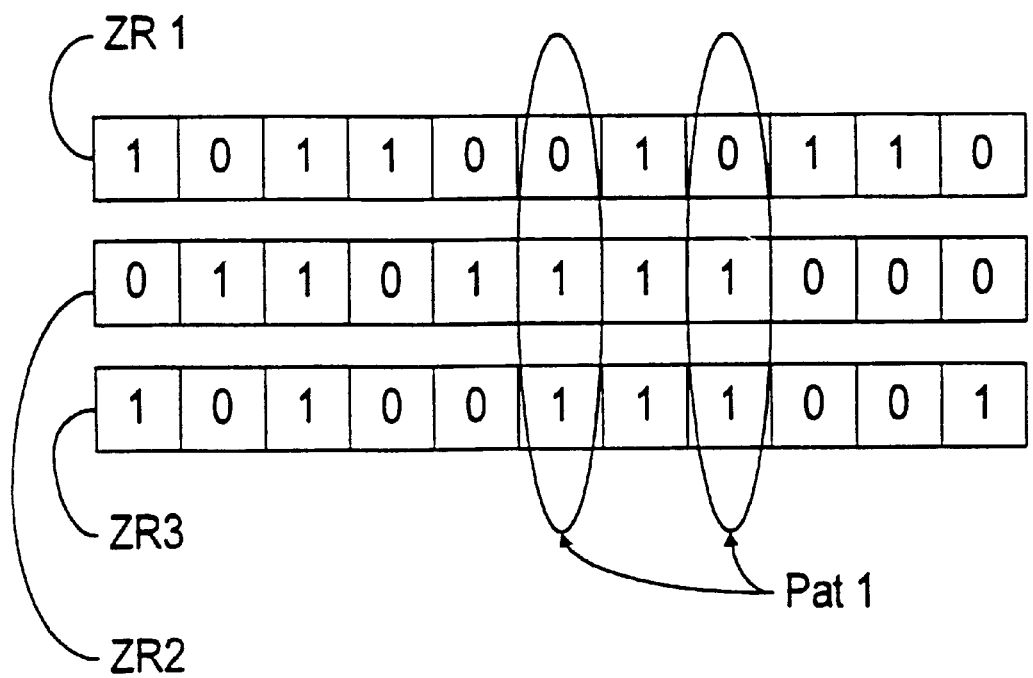
FIG. 1 shows illustrative measurement data of various time series.

FIG. 1 indicates three different time series ZR1, ZR2 and ZR3 by way of example.

Generally, the order O is determined by the maximum number of "1s" occurring. In relation to an application example, the "1s" may be interpreted as the firing of a neuron. There are generally $2^O$ different combinations in the case of O binary measurement series. In the example, the order is equal to three and there are eight different binary combinations. This example which is represented in FIG. 1 is continued in FIG. 2 in order to explain the method according to the invention.

Figure 2:
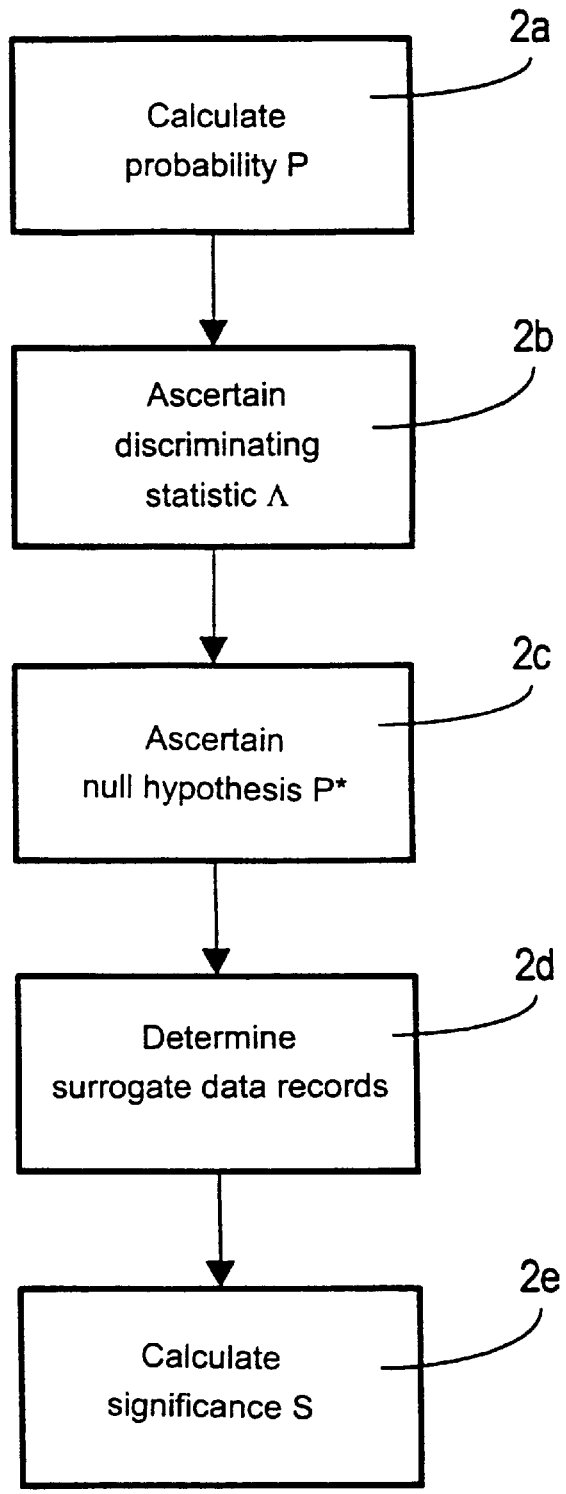
FIG. 2 shows a block diagram which represents the steps of the method according to the invention.

FIG. 2 represents a block diagram which contains the individual steps of the method according to the invention. With the aid of different measurement series, which may originate from neurons, a real occurrence probability for each different binary combination is calculated (see step 2a). This probability P is given as $$P_j = \frac{K_j}{S(K)} \forall j, \tag{2}$$

- $j$     respectively denoting a possible binary combination,
- $K_j$    denoting a frequency of the occurence of a possible binary combination $j$ of the order in question, and
- $S(K)$ denoting a number of the values in the measurement series.

In relation to the example represented in FIG. 1, this means calculating the probability P for all possible binary combinations of the corresponding order, that is to say for the triple $$\{(000), (001), (010), (011), (100), (101), (110), (111)\} \tag{3}$$

A discriminating statistic Λ is given by the T. M. Cover reference as (see FIG. 2, step 2b):

$$\Lambda = R(x,z|y) - R(x,z), \tag{4}$$

R( . . . ) denoting a redundancy, x,y,z denoting an i-th order tuple consisting of the values of the measurement series.

The formula (4) indicated here can be logically extended for higher-order discriminating statistics.

The null hypothesis P* is determined in step 2c according to $$P^*(1_A) = P(1_A) + (-1)^{|A|} \cdot w, \tag{5}$$

-continued $$\text{with } 1_A(i) = \begin{cases} 0 & \text{if } i \notin A \\ 1 & \text{if } i \in A, \end{cases} \quad (5a)$$

w    denoting a perturbation variable,

A    denoting a set which denotes the arrangement of binary data in a tuple whose order is determined by the maximum number of "1s" appearing, and

|A|    denotes the power of the set A

To explain formula (4) above, it may be mentioned that when there is an odd number of "1s" in the tuple, the sign is negative, otherwise it is positive.

The pertubation variable w will be determined below such that the discriminating statistic Λ gives a null result from the null hypothesis, i.e.

$$\Lambda(P^*) = 0 \quad (6),$$

With the condition that the pertubation variable w lies in a range $$w_{min} < w < w_{max} \quad (7a)$$

it being in this case necessary to respect the condition $$0 < P^*(1_A) < 1 \forall A \quad (7b)$$

$1_A$ denotes all possible permutations of "1s" in a tuple with power |A|. Additionally, a constraint is imposed according to the sum of all occurrence probabilities of the null hypothesis:

$$\sum_A P^*(1_A) = 1; \quad (8)$$

Using the null hypothesis P*, surrogate data records, i.e. arbitrary instances of the null hypothesis condition, are determined by random generator (step 2d). Expressed a different way, "dice are thrown" for the measurement series, the "die" having the occurrence probability fixed by the null hypothesis for each possible combination.

The decision as to whether or not there is synchronicity, is determined by a significance S (step 2e):

$$S = \frac{|\Lambda - \mu_S|}{\sigma_S} \quad (9)$$

$$\text{with } \mu_S = \frac{1}{N} \cdot \sum_{i=1}^{N} D_{S_i} \quad (10a)$$

$$\text{and } \sigma_S = \sqrt{\frac{1}{N} \cdot \sum_{i=1}^{N} (D_{S_i} - \mu_S)^2} \quad (10b)$$

$D_{S_i}$    denoting the discriminating statistic of an i-th surrogate data record which has been produced by the null hypothesis, $\mu_S$    denotes an estimated mean of the discriminating statistic of the surrogate data record, $\sigma_S$    denotes an estimated variance of the discriminating statistic of the surrogate data record and N    denotes a length of the surrogate data record.

An advantageous application of the method according to the invention consists, as mentioned above in the use of measurement series which are based on the firing of real neurons. The method can equally be applied to any binary frequency data.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for detecting synchronicity between several digital measurement series using a computer, comprising the steps of:

a) using an order to indicate a number of measurement series taken into account which are to be examined for synchronicity;

b) calculating an occurrence probability $P_j$ for different binary combination $K_j$ such that $$P_j = \frac{K_j}{S(K)} \forall j,$$

j    respectively denoting a possible binary combination, $K_j$    denoting a frequency of occurence of a possible binary combination j of the order in question, S(K)    denoting a number of values in the measurement series;

c) determining a discriminating statistic Λ depending on the order given in step a);

d) forming a null hypothesis, P*, such that $$P^*(1_A) = P(1_A) + (-1)^{|A|} \cdot w,$$

-continued with $1_A(i) = \begin{cases} 0 & \text{if } i \notin A \\ 1 & \text{if } i \in A, \end{cases}$ w  denoting a perturbation variable, A  denoting a set which denotes an arrangement of binary data in a tuple whose order is determined by a maximum number of ones appearing, and

|A|  denotes the power of the set A e) looking up a perturbation variable w such that $\Lambda(P^*)=0$ $W_{min}$ and $W_{max}$ being defined such that $0 < P^*(1_A) < 1 \forall A$ with the constraint $\sum_A P^r(1_A) = 1;$ f) determining surrogate data records, which are arbitrary instances of a condition of the null hypothesis P*:

g) determining, for establishing existence of synchronicity, a significance S such that $S = \frac{|\Lambda - \mu_S|}{\sigma_S}$ with $\mu_S = \frac{1}{N} \cdot \sum_{i=1}^{N} D_{S_i}$ and $\sigma_S = \sqrt{\frac{1}{N} \cdot \sum_{i=1}^{N} (D_{S_i} - \mu_S)^2}$, $D_{S_i}$  denoting a discriminating statistic of an i-th surrogate data record which has been produced by the null hypothesis, $\mu_S$  denoting an estimated mean of the discriminating statistic of the surrogate data record, $\sigma_S$  denoting an estimated variance of the discriminating statistic of the surrogate data record and N  denoting a length of the surrogate data record.

2. The method as claimed in claim 1, wherein time series of different neurons are used as the digital measurement series.

* * * * *